(12) United States Patent
Godzik et al.

(10) Patent No.: US 8,037,094 B2
(45) Date of Patent: Oct. 11, 2011

(54) ANNOTATION AND PUBLICATION FRAMEWORK

(75) Inventors: Adam Godzik, San Diego, CA (US); Sri Krishna Subramanian, San Diego, CA (US); Dana Grace Weekes, Encinitas, CA (US)

(73) Assignee: The Burnham Institute, La Jolla, CA (US)

( * ) Notice: Subject to any disclaimer, the term of this patent is extended or adjusted under 35 U.S.C. 154(b) by 966 days.

(21) Appl. No.: 11/838,829

(22) Filed: Aug. 14, 2007

(65) Prior Publication Data

US 2009/0049046 A1    Feb. 19, 2009

(51) Int. Cl.
G06F 7/00 (2006.01)
G06F 17/30 (2006.01)

(52) U.S. Cl. ...................................... 707/783
(58) Field of Classification Search .................. None
See application file for complete search history.

(56) References Cited

U.S. PATENT DOCUMENTS

| | | |
|---|---|---|
| 2003/0233422 A1 | 12/2003 | Csaszar et al. |
| 2004/0237033 A1 | 11/2004 | Woolf et al. |
| 2006/0218491 A1 | 9/2006 | Grossman et al. |
| 2007/0011155 A1* | 1/2007 | Sarkar .............................. 707/5 |
| 2007/0081197 A1* | 4/2007 | Omoigui ....................... 358/403 |
| 2007/0174387 A1* | 7/2007 | Jania et al. .................... 709/204 |
| 2007/0180388 A1 | 8/2007 | Izhikevich |
| 2009/0271381 A1* | 10/2009 | Beezer et al. ..................... 707/3 |
| 2010/0042700 A1* | 2/2010 | Harper et al. ................. 709/217 |

OTHER PUBLICATIONS

Kustanowitz et al, "Motivating annotation for personal digital photo libraries: lowering barriers while raising incentives" University of Maryland 2005, 10 pages.*

* cited by examiner

*Primary Examiner* — Uyen T. Le
(74) *Attorney, Agent, or Firm* — Woodcock Washburn, LLP (57) ABSTRACT

A hybrid annotation and publication system can access content in a scalable manner from databases, allowing for its editing and publication via wiki-style programs, while at the same time allowing for peer-review of such content via peer-review programs. This system balances the wiki-style programs, the peer-review programs, and any database store accesses in a manner appropriate to the need at hand according to various heuristics. For instance, the system can be accessed via a web browser, and data provided from various databases can be edited. Such data can be stored in the system in a hierarchical manner. Once the content is annotated, it can be reviewed (at various levels, ranging from expert to novice). Upon review, such content can be published using the wiki programs, so that the content is ready for public and/or private consumption.

20 Claims, 9 Drawing Sheets

ANNOTATION AND PUBLICATION FRAMEWORK

FIELD OF THE INVENTION

The presently disclosed subject matter relates to the field of computing, and more particularly, to fields such as annotating and publishing content using computing resources.

BACKGROUND OF THE INVENTION

Wiki-style programs allow users to edit and publish content, but alone are limited to the content accessible by their users (whether users provide this content personally or from some other source). Database systems, however, have lots of content, but this content is not always curated in meaningful and useful ways. Thus, what is needed is a hybrid system that can access content in a scalable manner, allow for its editing and publication, while at the same time allowing for peer-review of such content.

SUMMARY OF THE INVENTION

A hybrid annotation and publication system is disclosed herein that can access content in a scalable manner from databases, allow for its editing and publication via a wiki-style program, while at the same time allowing for peer-review of such content via a peer-review program. This annotation and publication system can balance the wiki-style program, the peer-review program, and any database store accesses in a manner appropriate to the need at hand according to various heuristics.

In one exemplary and non-limiting aspect, users can access the annotation and publication system via a web browser and start editing data provided from various databases, whether local or remote to the system. Such data can be stored in the system in a hierarchical manner, having a base of annotation content and other subsets of such content of interest to users (and perhaps suitable for publication). Once users are done annotating the content, peers can review it (various levels of peer review can be implemented, from expert to novice). Upon review, such content can be published using the aforementioned wiki program, so that the content is ready for public and/or private consumption (e.g. when private consumption includes premium content).

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are illustrated. However, the disclosure is not limited to the specific aspects shown. The following figures are included:

FIG. 7 illustrates various features of a publication and annotation system, including wiki-style editing, email notification, online editor, instant publication, release of different versions, and so on;

FIG. 8 illustrates the different kinds of content that can be stored, processed, and displayed by the system, such as notes, papers, high-impact publications and so on.

DETAILED DESCRIPTION OF ILLUSTRATIVE EMBODIMENTS

I. Overview

Figure 1:
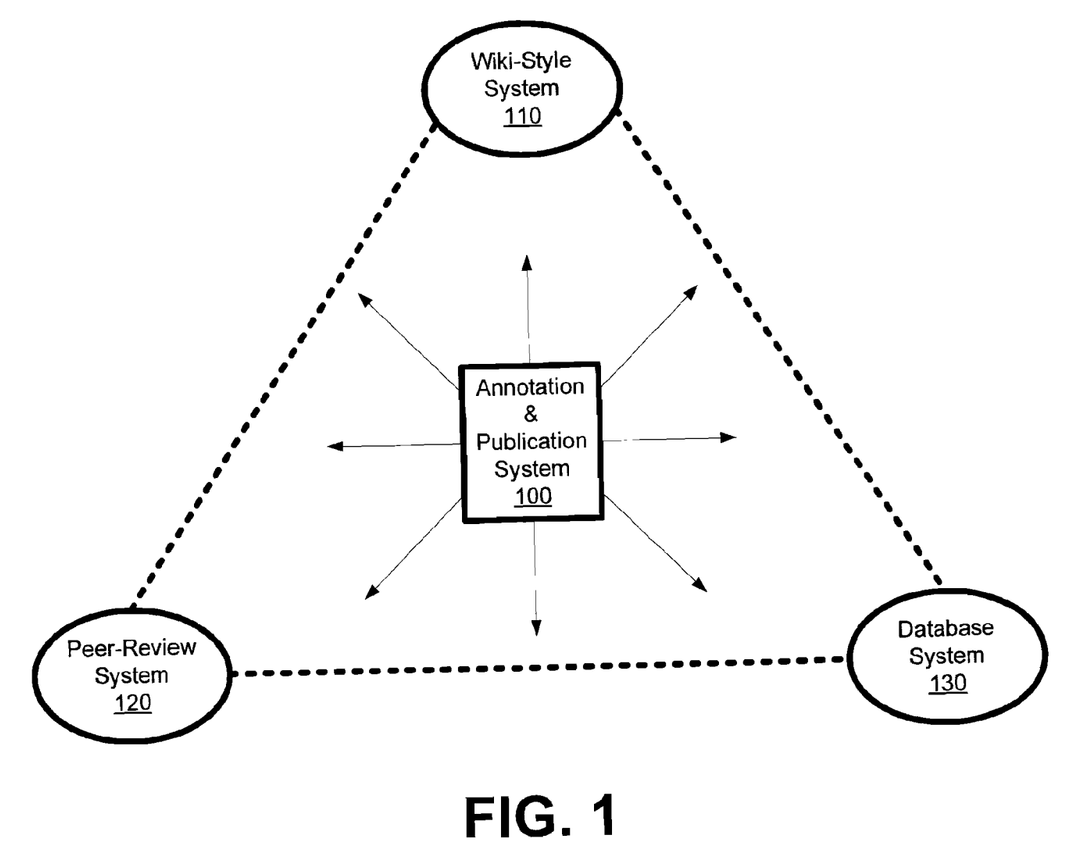
FIG. 1 provides a conceptual illustration of how an annotation and publication system can be adjusted in relation to a wiki system, a peer-review system, and a database system, all three of which the system may incorporate for it's own use.
Figure 2:
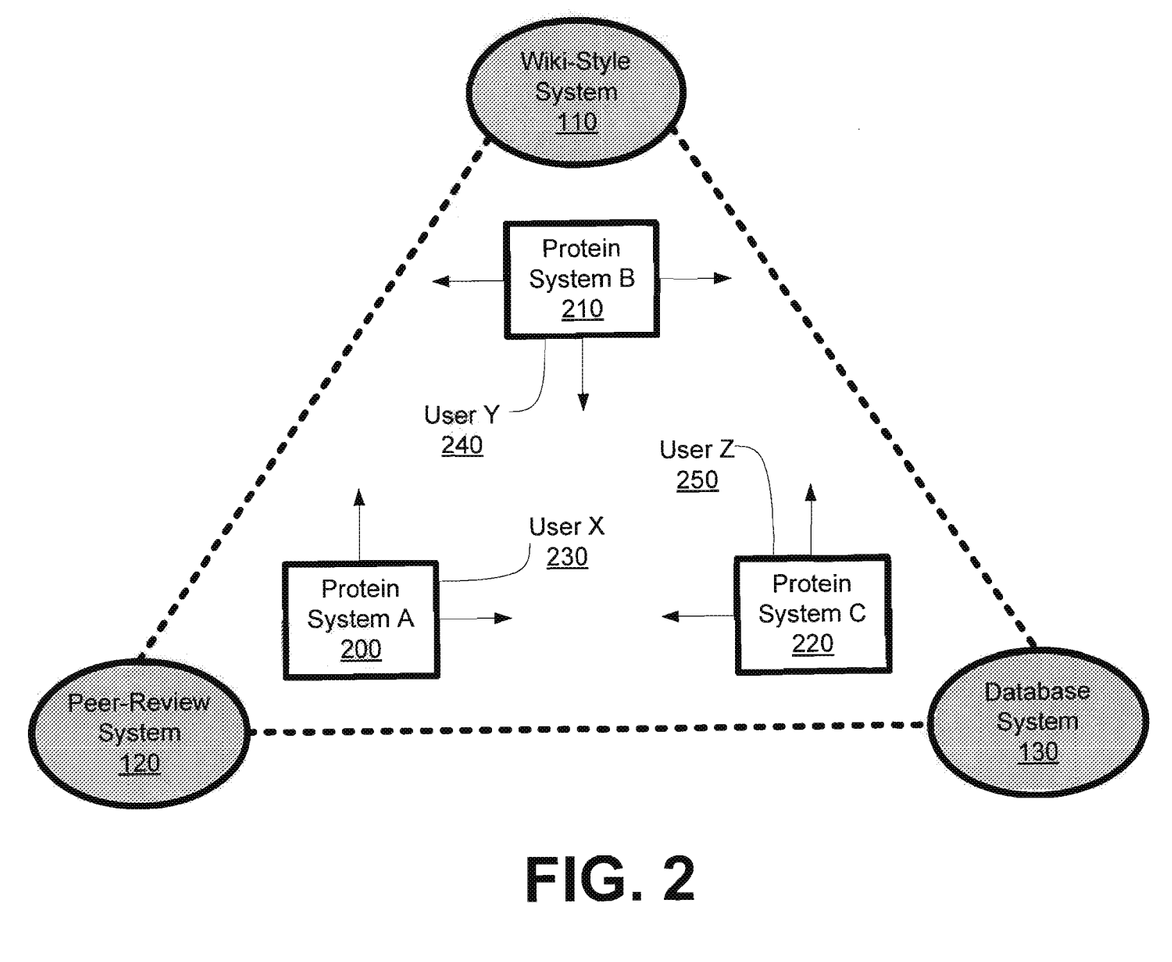
FIG. 2 illustrates the notion that the annotation and publication system can be instantiated in various forms, such as a protein structure system, and that the system can be adjusted in various ways to provide users rich experiences.

This Detailed Description discusses various exemplary and non-limiting aspects of the presently disclosed subject matter. FIGS. 1 and 2 provide conceptual and real world examples, respectively, of one aspect that includes a wiki system, a peer-review system, and a database system. Then, FIGS. 3-5 flesh out each of the components discussed in reference to FIGS. 1 and 2. Namely, FIG. 3 discusses the wiki-system in detail; FIG. 4 discusses the peer-review system in detail; and, FIG. 5 discusses the database system in detail. Then, FIG. 6 considers two alternative annotation and publication systems, one a centralized system and the other a distributed system.

Figure 6:
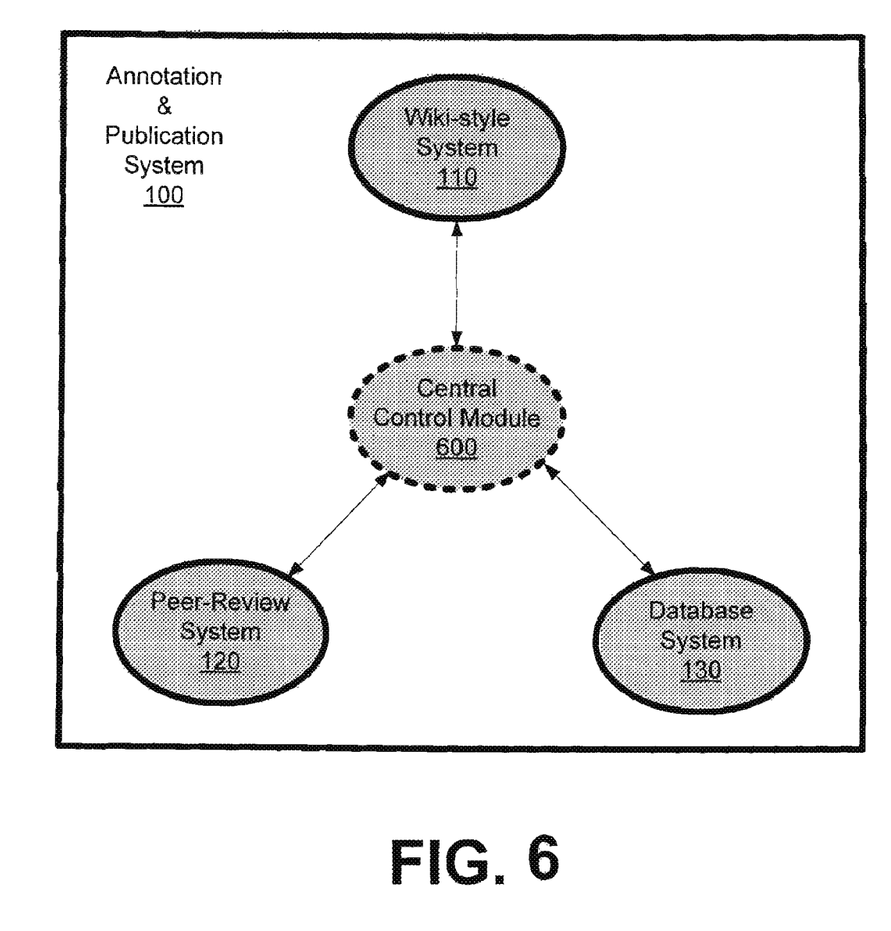
FIG. 6 illustrates an aspect of the present disclosure that has a central (but optional) governing module among the wiki system, the database system, and the peer-review system.
Figure 7:
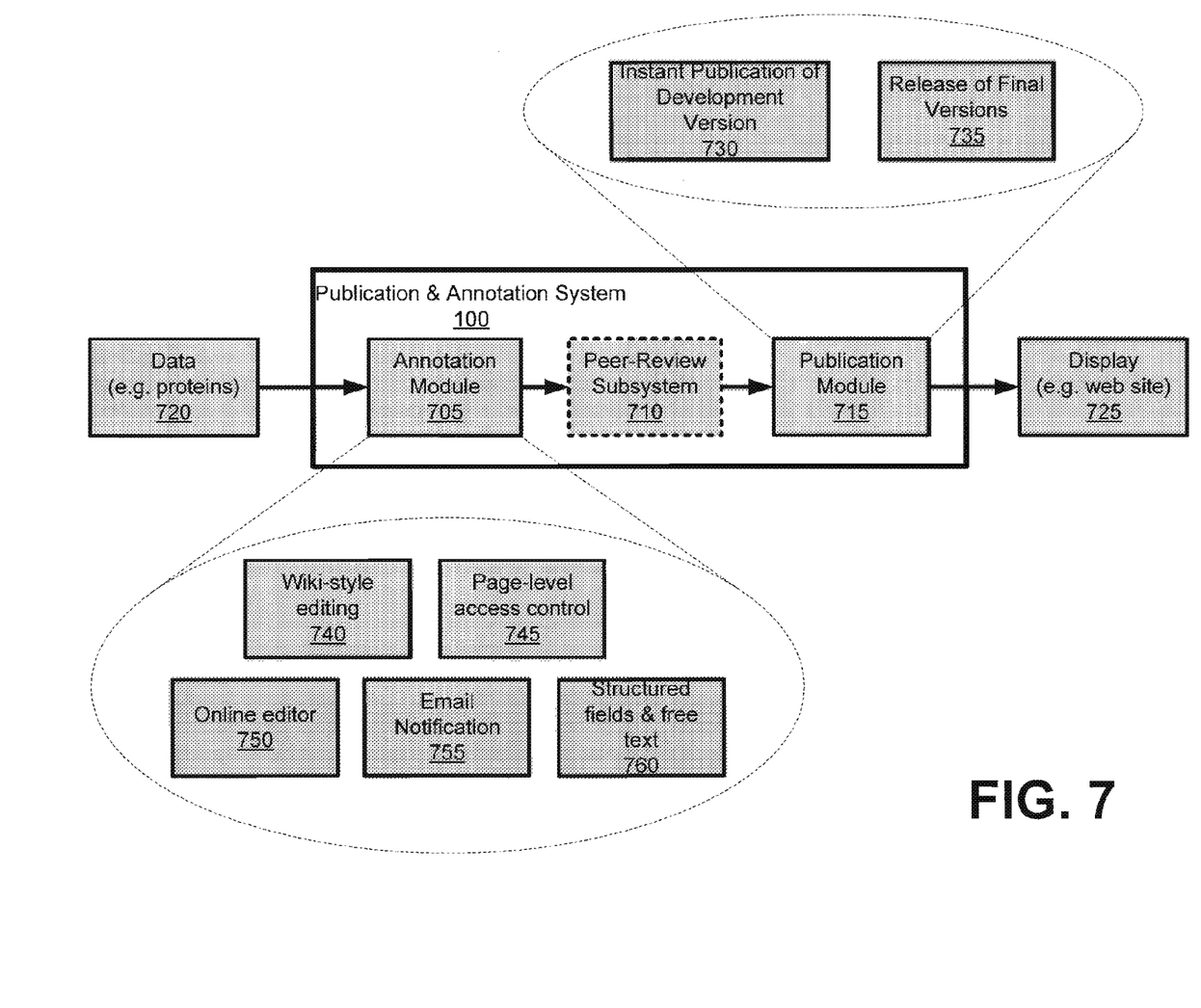
Figure 8:
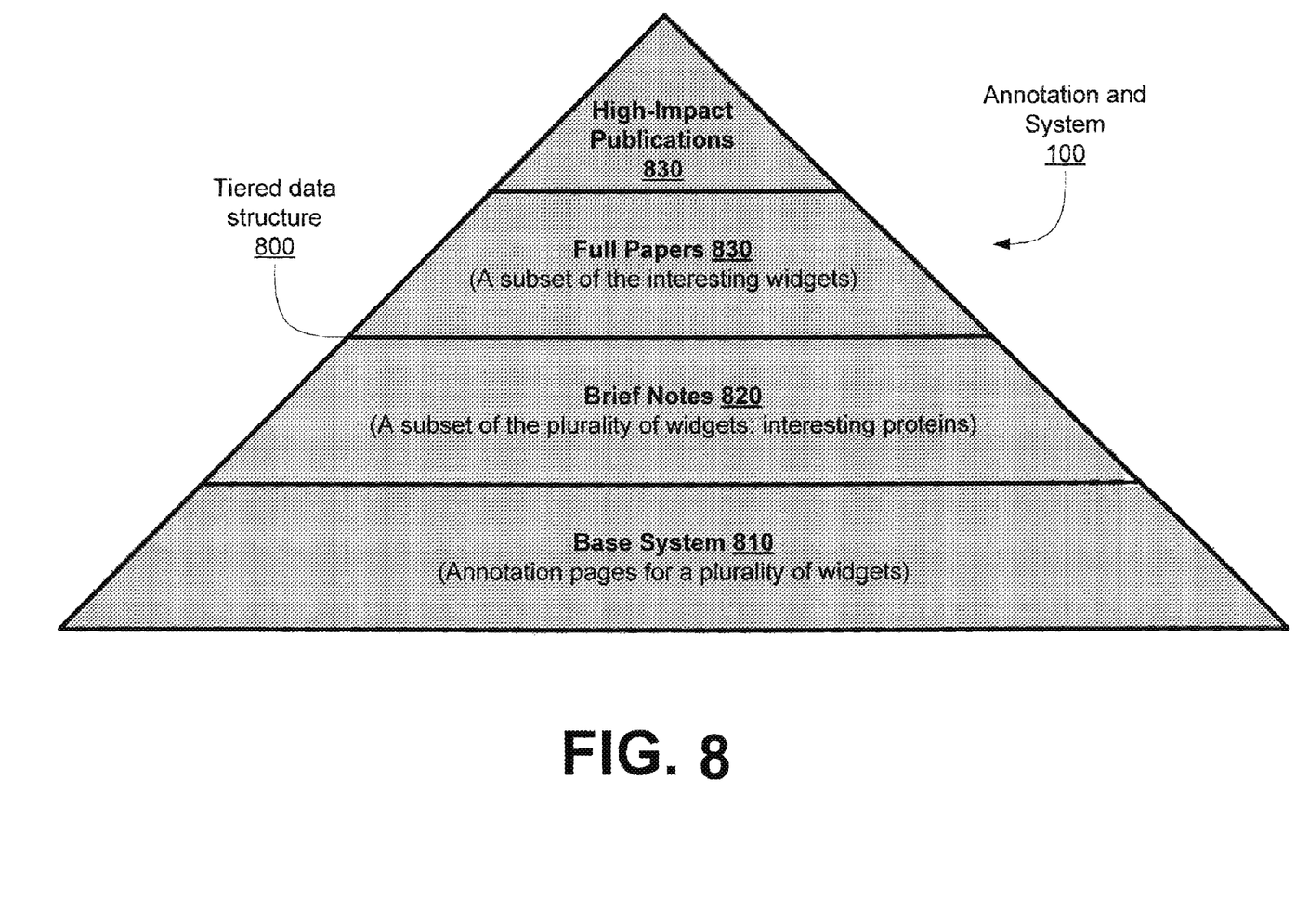
Figure 9:
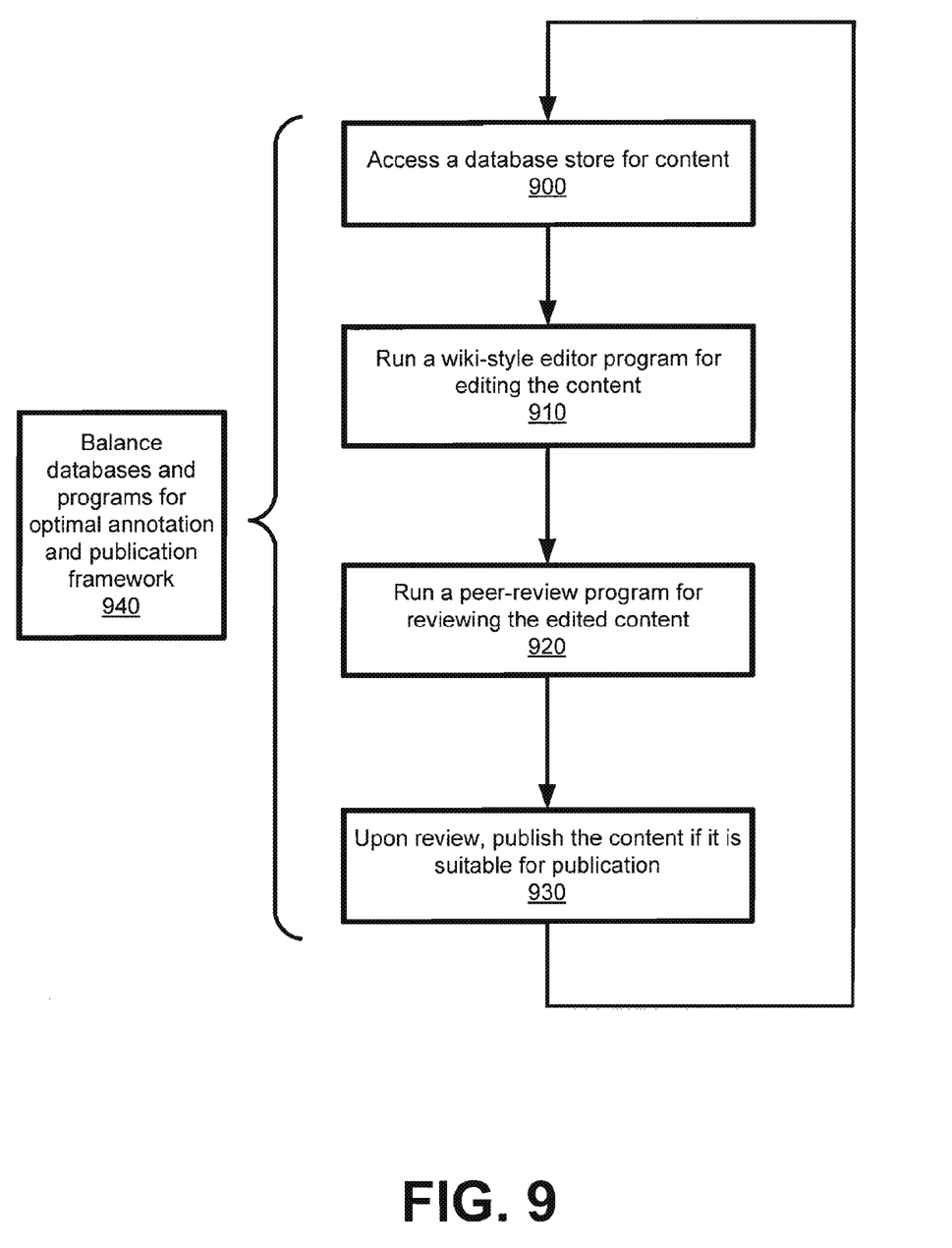
FIG. 9 illustrates a flow chart of one exemplary and non-limiting aspect of the present disclosure that includes the balancing of database and wiki-style and peer-review programs.

FIG. 7 takes an atomic point of view of the publication and annotation system, focusing on an annotation, peer-review, and publication modules. And, FIG. 8 provides one example of how data is such an annotation and publication system can be stored (e.g. it can be stored hierarchically). Lastly, FIG. 9 provides a flow diagram of one aspect of the presently disclosed subject matter, explaining in the process how an instantiated system might work. As mentioned above, FIGS. 1-9 are merely exemplary and non-limiting aspects of the presently disclosed subject matter.

II. Aspects of Annotation and Publication Systems, Methods, and Computer Readable Media FIG. 1 illustrates an annotation and publication system 100 ("the system") that is based on some combination of a wiki-style system 110, a peer-review system 120, and a database system 130. These three systems 110, 120, 130 can either be sub-systems of the system 100, or they can be independent systems working together with the system 100. In either case, by way of example and not limitation, the system 100 can use the wiki-style system 110 to allow users to input information for annotation and publication purposes; it can use the peer-review system 120 to allow peers of the input user to review the information; and, it can use a database system 130 to incorporate information that may serve as content for the wiki-style system 110 and peer-review system 120.

For example, the wiki-style system 110 can be a web site that allows visitors to add, remove, and/or edit content. This can be a collaborative platform for organizing information.

Such information can be organized, for example, as linked web pages. Also, by way of example, the peer-review system 120 can be a system that allows certain visitors to gain access to the web site as registered users (e.g. being assigned log-in and password information). Thus, the peer review process can be delineated along various predetermined heuristics; for instance, certain users can review certain information in the system 100 but not other information. This can lead to having a tiered and/or hierarchical review process (yet, other review process models are contemplated herein). Lastly, the database system 130 can comprise of various databases that can provide content to the system 100. As is explained in more detail below, with reference to FIG. 3, such a database system 130 can be a central or distributed system originating content from various sources and/or locations.

In FIG. 1, conceptually speaking, the system 100 can be adjusted to fit anywhere in between the three systems 110, 120, and 130 mentioned above. Thus, FIG. 1 is an illustration meant to show that the system 100 can be adjusted with more emphasis on the wiki aspect 110, or the peer-review aspect 120, or the database aspect 130. Ultimately, one goal of the presently disclosed subject matter is to find a "sweet spot" between these three systems 110, 120, 130, such that the system 100 is an efficient and useful combination of a wiki-style system 110 that allows for adding, deleting, and/or updating content, a peer-review system 120 that allows for a collaborative community of users to provide feedback, and a database system 130 that allows for incorporating content into the system 100. Different embodiments of the system 100 will emphasize differently where the system 100 stands in relation to the other systems 110, 120, 130.

In one aspect of the presently disclosed subject matter, the "sweet" spot can be achieved by obtaining statistics of what the users of a given instance of the system prefer and/or the direction in which the project (implementation of the system) is going. The sweet spot can vary for different instances of the system and can be found via various heuristics. One advantage of the system is that the relative weights of the different components (e.g. subsystems) can be changed dynamically, thus adjusting the system appropriately to the need at hand.

In another aspect of the presently disclosed subject matter, heuristics can be determined on a case-by-case basis and they can be variable, and therefore a diverse set of techniques can be applied to determine the "sweet spot." For example, while determining such heuristics, the following considerations can be taken into account (individually or in combination): what is the nature of the original data provided by the database system; what is envisaged final product—i.e. what is the final data to look like; what values should be added to original data so that the final form envisaged can be achieved, and so on. Needless to say, in order to start at the original data and arrive at the final form envisaged, the parameters of the system can be adjusted several times (and then readjusted) when it is believed that the system is moving away from the intended goal. Then again, other considerations can also impinge on this system, such as when quality of data is desired over speed of the system, in such a case a time constraint can be more relaxed and more emphasis can be laid on quality.

FIG. 2 provides a concrete example of the conceptual aspects of the system 100 discussed with reference to FIG. 1. Similar set up to that of FIG. 1 is shown in FIG. 2, with a wiki-style system 110, a peer-review system 120, and a database system 130. In one exemplary and non-limiting aspect of the present disclosure, various annotation and publication systems are shown, such as protein structure systems 200, 210, 220. These systems 200, 210, 220 allow various individuals to annotate, publish, and review protein structures.

However, as those of skill in the art will readily appreciate, the system 100 shown in FIG. 1 can be used in combination with other kinds of subject matter—other than proteins structures—, which may include other biological subject matter, or more broadly, organic or inorganic subject matter. In fact, the system 100 can be used to annotate and publish any information of interest to any users.

In FIG. 2, one protein system A 200 is shown, and this system can be configured for a certain user, such as user X 230. A different protein system B 210 can be configured differently for a different user Y 240; and, still a third user Z 250 can interface with a protein system C 220 that may differ from the other systems 200, 210. These protein systems 200, 210, 220 may be species of the genus system 100 shown in FIG. 1. Other species, as mentioned above, are also contemplated herein.

The systems 200, 210, 220 may be configured differently for different users because of the different tasks and/or goals these users may have. For example, user X 230 may be a reviewer who is only interested in (or maybe limited to) reviewing content of the system 100. Thus, such a user X 230 would primarily interact with the system 100 as instantiated in the exemplary protein system A 200. Another user Z 250 who was only interested in (or maybe limited to) incorporating database information for proteins, might experience the system 100 as protein system C 220, and so on. One general goal of the system 100 is to provide a flexible interface to annotation and publication depending on the type of user that is engaging the system 100. Conversely, as those of skill in the art will appreciate, the system 100 could alternatively provide a uniform experience to all its users.

FIG. 2 shows that not only can the protein systems 200, 210, 220 be tailored to particular users, but that these systems 200, 210, 220 can be dynamic in that they can change based on user inputs or feedback (or other factors)—this notion is indicated by the arrows associated with each system 200, 210, 220. For instance, protein system A 200 configured for user X 230 can change based on various inputs. If user X 230 becomes more interested in editing content (thereby interacting more with the wiki-style system 110 vis-à-vis the peer-review system 120), the experience provided by the protein system A 200 can adjust accordingly. The system 100 as a whole can be instantiated in various ways and for various purposes, and FIG. 2 presents only one exemplary and non-limiting real world application.

In FIG. 2, user X 230 can peer-review, using the review system 120, any protein structures submitted or edited by user Y 240 who uses the wiki-style system 110, against a background of various protein structures provided by the database system 130. Of course, it will be readily appreciated that the various users 230, 240, 250 may overlap in their roles, such as user Y 240 can be the same person as user Z 250. Thus, the use of the term "user" herein is merely illustrative and conceptual but not limiting. In fact, all three protein systems 200, 210, 220 can be used by the same conceptual user X 230, for example.

Figure 3:
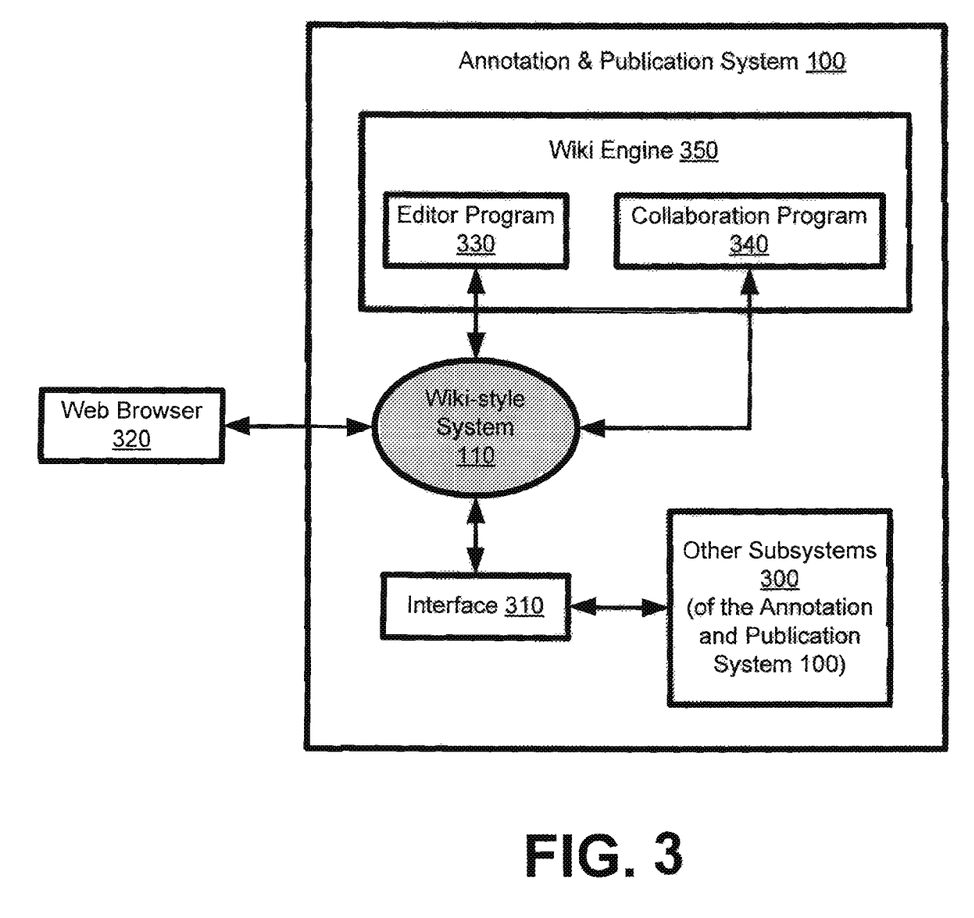
FIG. 3 explains in more detail the relationship of the wiki system to the annotation and publication system.
Figure 4:
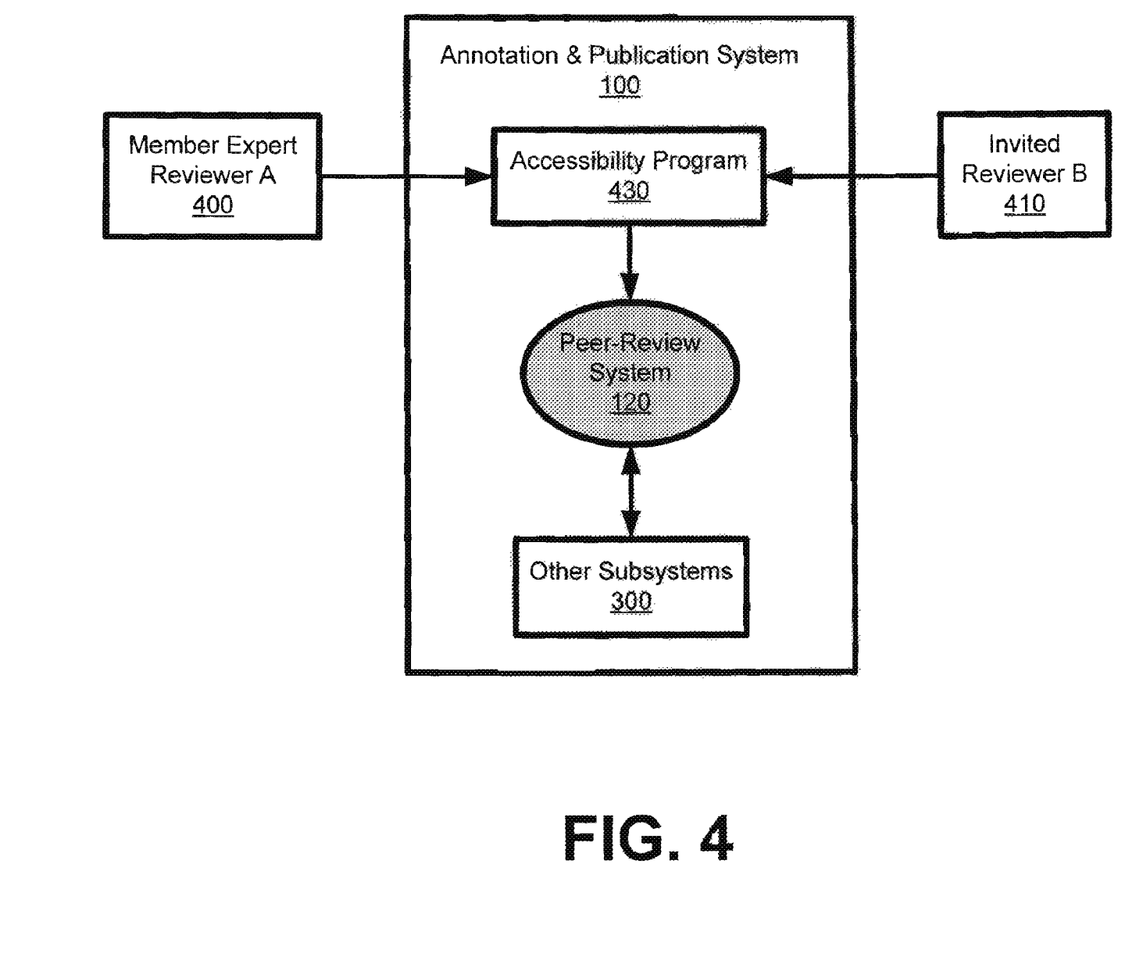
FIG. 4 explains in more detail the relationship of the peer-review system to the annotation and publication system.

Next, FIG. 3 explains in more detail the first of the three systems 110, 120, 130, namely, the wiki-style system 110, and how this system 110 relates to the general system 100. According to FIG. 3, in one exemplary and non-limiting aspect of the present disclosure, the wiki-style system 110 allows for adding, removing, and/or editing of content. Since the wiki-style system 110 can be part of the overall system 100, it can interface 310 with other subsystems or components 300 of the system 100 (the peer-review system 120 and the database system 130 being only two components out of a plurality of other components). The wiki-style system 110 may be a traditional text based wiki system or a specialized system for the content at hand. In the latter case, for instance, content such as protein structures may include various sequences and illustrative depictions of proteins (and/or animations of how proteins fold). In any event, the wiki-style system 110 may include an editor program 330 and a collaboration program 340, as two exemplary components of a wiki engine 350 that allow various users to annotate the content at hand. This content then may be published and made accessible via a web browser 320.

It will be appreciated by those of skill in the art that the wiki-style system 110 may also provide various other advantages in connection with the system 100 described above. For example, the wiki-style system 110 may keep track of document history and the changes to such documents. Thus, if a change is made the content can become the most current content, and the previous version can be archived (the archiving component is not shown, but is understood to be part of the wiki-style system 110 as an option). Different version of documents can be quickly compared side-by-side, and edits can be rolled back, if necessary.

Next, FIG. 4 explains in more detail the second of the three systems 110, 120, 130, namely, the peer-review system 120. The peer-review system 120 can interface with the other systems 300 of the main system (e.g. the wiki-style system 110, the database system 130, and/or other systems). In one aspect of the present disclosure, the peer-review system 120 can be accessed by any users who may wish to annotate and publish information using the system 100. However, in a different aspect, an accessibility program 430 may be used in order to screen which individuals will be able to review content associated with the system 100.

By way of example, an expert 400 who is a registered member of the system 100 can review the content in the system 100. Alternatively, certain reviewers who are not members 410 can be invited to review content. In either case, access to the peer-review system 120 may be monitored by the accessibility program 430 (e.g. a gateway program). Furthermore, it is also contemplated that a plurality of users can review a specific document or file, and that in such a scenario there may be various tier considerations to take into account. For instance, expert reviewers who are respected or have great authority in a given community may be weighted differently from novice reviewers. Various heuristics may be taken into account, such as education, years of experience, area of expertise with reference to the content being reviewed, and so on, which may lead to different individuals having different review capability when using the peer-review system 120.

Figure 5:
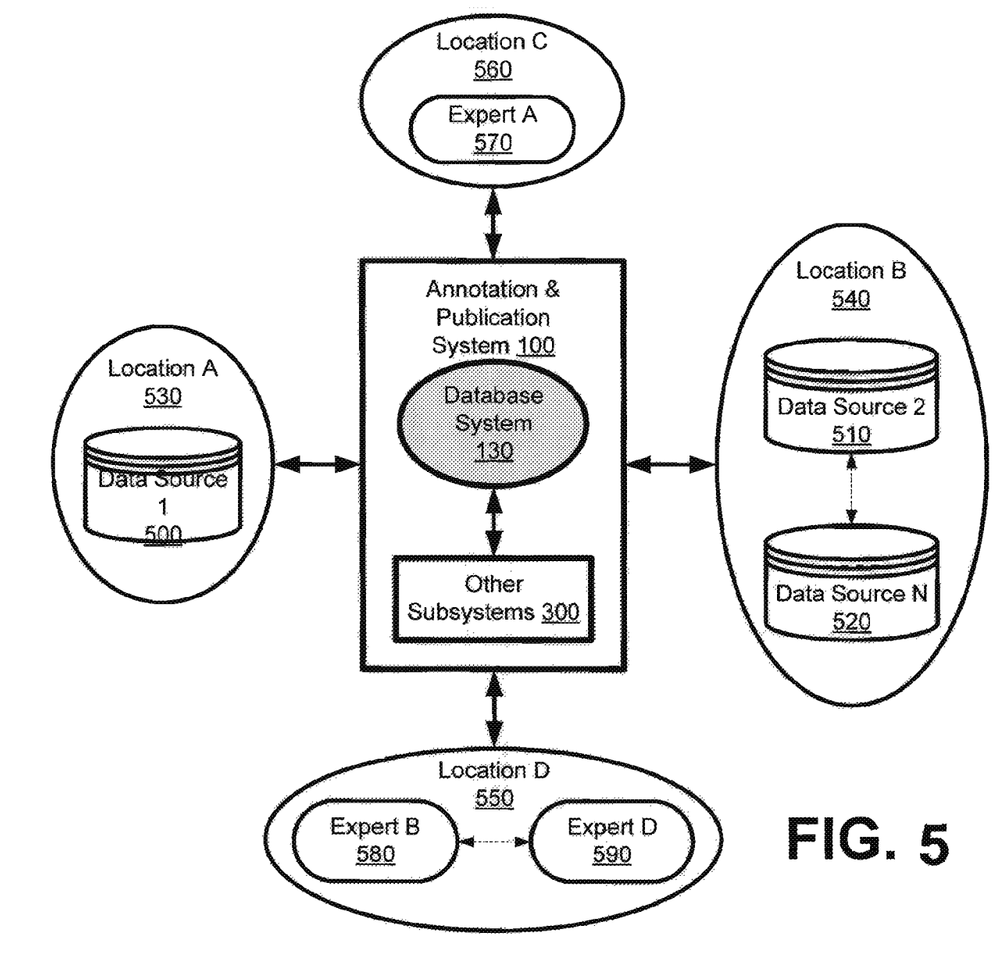
FIG. 5 explains in more detail the relationship of the database system to the annotation and publication system.

Next, FIG. 5 explains in more detail the last of the three systems 110, 120, 130, namely, the database system 130. The database system 130 can provide a substantial portion of the content to the overall system 100. While it is true that the wiki-style system 110 and the peer-review system 120 can provide content in the form of annotations and review thereof, respectively, the database system 130 can provide the underlying content against which annotations (and hence review) can be made.

Turning to FIG. 5, the database system 130 can interact with the other systems 300 (or subsystems, however they are characterized or however they relate to the overall system 100). The database system 130 can receive data from (or send data to or share data with) a first data source 500 at some location A 530. This location may either be local to the database system 130, or alternatively, it may be remote. The database system 130 may also gather data from other data sources, such as a second data source 510 and some other data source 520. These databases, in turn, may also be local or remote with respect to the database system 130 or with respect to each other 510, 520.

Aside from data sources that store data, 500, 510, 520, expert opinions, whether used as data or as feedback from the aforementioned peer-review system 120 can also be gathered and stored. Whether storage occurs in the data system 130 or the peer-review system 120 is a mere implementation detail, as those of skill in the art will readily appreciate. As FIG. 5 illustrates, expert opinions or databases 570, 580, 590 can be variously located 560, 550. All this information 500, 510, 520, 570, 580, 590 can be used by the overall system 100 in order to create a comprehensive and dynamic information center, maintained in a current and relevant format by annotating and peer-reviewing parties.

FIG. 6 illustrates the three systems 110, 120, 130 discussed above, and a central control module 600 that mediates and controls interactions between them. This central module 600 is shown in a dashed line, since in an alternative aspect of the presently disclosed subject matter, it does not have to be present in the system 100. In other words, the three system 110, 120, 130 could interact independently of a central module 600, and instead communicate with each other in a distributed fashion.

In the central control embodiment, for example, the module 600 allows users to use the wiki-style system 110 to annotate content provided by the database system 130, while also allowing peers to review the annotations and other information associated with the system 100 using the peer-review system 120. The control over the system 100 interactions can either be wholly located at the central module 600, or only partly so located (with the remaining parts being located at one of the systems 110, 120, 130 or in other modules either inside or outside the system 100).

In another aspect of the presently disclosed subject matter, FIG. 7 illustrates various features of a publication and annotation system. By way of example and not limitation, the publication and annotation system 100 discussed so far can have an annotation module or subsystem 705 and a publication module or subsystem 715. As these names suggest, the former module 705 allows users to mark up, write up, add, delete, insert, and so on, various content; the latter module 715 then, allows for this work product to be published (e.g. as a web page, a file, an electronic document, any other electronic content, and printed versions thereof). The shown peer-review module 710 can either be a separate module in itself, or it may be part of either the annotation module 705 or the publication module 715. This peer-review module 710, as explained in detail above, allows users of the system 100 to review content (preferably) before it is published (although, since it is published in electronic form, it can easily be reviewed and changed after publication—while maintaining archives of prior versions.).

The annotation module 705 can comprise of a wiki-style editing module 740, as indicated above. It can also allow for page-level access control 745, which means that users of the system 100 can control content down to the last detail, if the system 100 uses, for example, web pages to maintain and publish the content. The module 705 can also include an online editor 750 program that may allow for richer annotation, an email notification system 755 that may provide various notifications when content is being (or was) annotated, and structured field and free text 760 for easier generation of annotations. These, of course, are merely exemplary features of the annotation 705 module, and other features are contemplated herein also.

Just as the annotation module 705, the publication module 715 may also have various features. Again, by way of example and not limitation, the publication module 715 may comprise of an instant publication mechanism, where annotations (or content, in general) can be instantly published. Additionally, there may also be a module 735 that keeps track of the various different versions of published content. For example, perhaps only the final versions may be designated fit for publishing 735 (alternatively, intermediate versions may be published until the final versions are ready for publishing—this much is a mere implementation detail).

In FIG. 7, data 720 is supplied to the system 100, where such data 720 can originate (but does not have to so originate) at the database system 130 shown in FIGS. 1, 2, 5, and 6. This data 720 can then be annotated at the annotation module 705, peer-reviewed at the peer-review module 710, and then eventually published at the publication module 715. Once such data 720 that has been annotated, reviewed, and published, it can be displayed 725 (whether occurring at clients, servers, personal digital assistants, cell phones, or any suitable site for display). The system, as a whole or in part, may be processed and displayed on any computing device imaginable that has enough computing power to handle the instructions associated with the various modules and/or systems and/or subsystems.

Next, FIG. 8 shows the different kinds of content that can be stored, processed, and displayed by the system 100. This content can be tiered 800 in that different types of content can be stored, in some cases implying a hierarchy. For example, a bases system 810 can contain annotation pages for some content, such as widgets. A subset 820 of this can be a plurality of widgets that might be of special interest (in contrast to the bases system 810 that may contain all the available widgets). Such a subset 820 may be embodied in brief notes that have more organizational and in-depth detail than the annotation pages of the base system 810.

Furthermore, full papers 830 can also be a subset of the aforementioned brief notes 820. Such full papers 830 may contain more scrutinized content (e.g. peer-reviewed) than the other notes 820 or base content 810. Finally, high-impact publications 830 can also be part of the system 100, where such publications can be the distillations of the most germane and impacting content (whether such content is widgets, proteins, computers, social data, and so on—i.e. any given scholarly or interesting content). The tiered data structure 800 is depicted as a pyramid, but it can easily change shape if, for example, the high-impact publications approach the limit of the base system 810. For example, the shape would also change in the scenario where one set of brief notes 820 would give rise to a plurality of papers 830, and so on.

Lastly, FIG. 9 illustrates a flow chart of one exemplary and non-limiting aspect of the present disclosure. At block 900, a database store is accessed for content. As was already discussed with reference to FIG. 5, such database(s) can be local or remote, it can be central or distributed. The database can also provide a live feed to an annotation and publication framework (such as the one discussed above). Once content is obtained from such a database (e.g. in form of data numbers/text or data graphs or other graphics), at block 910, a wiki-style editor program can be run and such content can be edited in the various ways discussed with reference to the figures above, such as FIG. 1-3. This edited content, then, can be subjected to a peer review process via a peer-review program, as shown at block 920. Upon review, the content can be published if it is suitable for publication (various heuristics or rules can be used for when content should be published). In one aspect of the present disclosure, the databases are able to update themselves with content that has been enriched via the peer-review and wiki-style systems.

It should be noted, that this process can repeat indefinitely (as is indicated by the feedback arrow, from block 930 back to block 900) and in any order (not just the order shown: 900-910-920-930). During the flow of this process, the databases and various programs can be balanced for optimal annotation and publication, depending of the need and the accompanying heuristic(s) at hand.

Finally, it should also be noted that the various techniques described herein may be implemented in connection with hardware or software or, where appropriate, with a combination of both. Thus, the methods, systems, and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined.

Lastly, while the present disclosure has been described in connection with a plurality of exemplary aspects, as illustrated in the various figures, it is understood that other similar aspects may be used or modifications and additions may be made to the described aspects for performing the same function of the present disclosure without deviating therefrom. For example, in various aspects of the disclosure, processes and methods were described at least for annotating and publishing content that can be peer-reviewed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system comprising:
    a wiki-style subsystem comprising hardware and configured to allow a first set of users to manipulate content in accordance with a first heuristic;
    a peer-review subsystem comprising hardware and configured to allow a second set of users to review said content in accordance with a second heuristic; and
    a database subsystem comprising hardware and configured to provide at least part of said content to said wiki-style subsystem; and wherein said database subsystem, said peer-review subsystem, and said wiki-style subsystem are balanced in said system according to at least one heuristic.

2. The system according to claim 1, wherein at least one of said wiki-style subsystem, said peer review subsystem, and said database subsystem is accessible via a web browser.

3. The system according to claim 1, wherein at least one of said wiki-style subsystem, said peer review subsystem, and said database subsystem has secured access.

4. The system according to claim 1, wherein at least one of said wiki-style subsystem, said peer review subsystem, and said database subsystem is controlled by a central module.

5. The system according to claim 1, wherein said first set of users and said second set of users at least partly overlap.

6. The system according to claim 1, wherein at least one of said wiki-style subsystem, said peer review subsystem, and said database subsystem include at least one of (a) a wiki-style editing program, (b) page-level access control, (c) an online editor, (d) an email notification, (e) structured fields and free text, (f) an instant publication, (g) final version release functionality, and (h) a database store.

7. The system according to claim 1, wherein said content is structured hierarchically, including a base content and at least one subset of said base content configured for publication.

8. The system according to claim 1, wherein only a subset of said content is published.

9. The system according to claim 1, wherein at least part of said content is versioned and archived.

10. The system according to claim 1, wherein said at least one heuristic includes user preferences.

11. A method comprising:
    running in response to user input an online wiki editor program configured for users of said editor program;
    running in response to user input a peer-review program configured for said users of said peer-review program;
    accessing a database storing data used in conjunction with electronic content; and
    balancing said online wiki editor program, said peer-review program, and said database according to at least one dynamic heuristic such that said programs and said database allow any users associated therewith to manipulate said electronic content and then publish said content.

12. The method according to claim 11, providing access to at least one of said online wiki editor program, said peer-review program, and said database via a web browser.

13. The method according to claim 11, monitoring at least one of said online wiki editor program, said peer-review program, and said database for access by said users of said programs and said database.

14. The method according to claim 11, wherein said at least one heuristic includes user preferences.

15. A computer readable medium storing thereon computer executable instructions, said instructions comprising:
    an instruction configured to instantiate a wiki-style editing program for editing content;
    an instruction configured to instantiate a peer-review program for reviewing said content;
    an instruction configured to access a database store used in conjunction with said content; and
    an instruction configured to balance said editing of said wiki-style editing program, said reviewing of said peer-review program, and said accessing of said database according to a set of rules.

16. The computer readable medium according to claim 15, further comprising an instruction that checks for access rights to at least one of said wiki-style editing program, said peer review program, and said database.

17. The computer readable medium according to claim 15, further comprising an instruction that forms said content in a hierarchical format.

18. The computer readable medium according to claim 15, further comprising an instruction that coordinates at least one of said wiki-style editing program, said peer-review program, and said database from a central location.

19. The computer readable medium according to claim 15, further comprising an instruction that publishes said content upon peer review of a finalized version of said content.

20. The computer readable medium according to claim 15, wherein said set of rules includes user preferences.

* * * * *